US011097712B2

(12) United States Patent
Kawaguchi et al.

(10) Patent No.: US 11,097,712 B2
(45) Date of Patent: Aug. 24, 2021

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventors: Takateru Kawaguchi, Fuji (JP); Fumitaka Nagashima, Fuji (JP); Hideharu Yamamoto, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 280 days.

(21) Appl. No.: 16/329,216

(22) PCT Filed: Oct. 26, 2017

(86) PCT No.: PCT/JP2017/038811
§ 371 (c)(1),
(2) Date: Feb. 28, 2019

(87) PCT Pub. No.: WO2018/088233
PCT Pub. Date: May 17, 2018

(65) Prior Publication Data
US 2019/0242478 A1 Aug. 8, 2019

(30) Foreign Application Priority Data

Nov. 10, 2016 (JP) .............................. JP2016-219872

(51) Int. Cl.
*B60W 10/06* (2006.01)
*B60W 10/18* (2012.01)
(Continued)

(52) U.S. Cl.
CPC ............ *B60W 10/06* (2013.01); *B60W 10/11* (2013.01); *B60W 10/182* (2013.01);
(Continued)

(58) Field of Classification Search
CPC ............... B60W 10/06; B60W 10/182; B60W 30/18027; B60W 2510/1005;
(Continued)

(56) References Cited

U.S. PATENT DOCUMENTS 5,807,205 A * 9/1998 Odaka ...................... B60L 7/00
477/29
10,518,774 B2 * 12/2019 Iwanaka ............. B60W 10/196
(Continued)

FOREIGN PATENT DOCUMENTS

JP        2007-303611 A    11/2007
JP        2008128444 A      6/2008
(Continued)

OTHER PUBLICATIONS

PCT International Search Report (with English Translation) and Written Opinion (Japanese Language only) in corresponding International Application No. PCT/JP2017/038811 dated Jan. 16, 2018.

*Primary Examiner* — David R Morris
(74) *Attorney, Agent, or Firm* — Foley & Lardner LLP

(57) ABSTRACT

A control device is provided for a vehicle including a drive source and an automatic transmission having a park lock mechanism for locking an output shaft and an engaging element to be engaged at the start of running. Output rotation of the drive source is input to the automatic transmission. The control device includes a control unit to limit a torque of the drive source until the release of locking by the park lock mechanism is completed in response to an instruction being given to change from a parking range to a travel range. The control unit is configured to limit the torque of the drive source from after the instruction is given to change from the parking range to the travel range until the release of locking by the park lock mechanism is completed.

6 Claims, 3 Drawing Sheets

(51) Int. Cl.
*B60W 30/18* (2012.01)
*F16H 63/48* (2006.01)
*F16H 63/34* (2006.01)
*B60W 10/11* (2012.01)

(52) U.S. Cl.
CPC ......... *F16H 63/3416* (2013.01); *F16H 63/48* (2013.01); *B60W 30/18027* (2013.01); *B60W 2510/1005* (2013.01); *B60W 2510/186* (2013.01); *B60W 2540/10* (2013.01); *B60W 2710/0666* (2013.01)

(58) Field of Classification Search
CPC ....... B60W 2540/10; B60W 2710/0666; F16H 59/18–24; F16H 2063/506–508
See application file for complete search history.

(56) References Cited

U.S. PATENT DOCUMENTS

2008/0051252 A1* 2/2008 Nishimura .............. B60T 1/005
477/92
2010/0262329 A1* 10/2010 Monti .................... B60T 7/122
701/31.4
2019/0047570 A1* 2/2019 Iwanaka ................ F02D 29/02

FOREIGN PATENT DOCUMENTS

| JP | 2011-126474 A | 6/2011 |
| JP | 2017-180253 A | 10/2017 |

\* cited by examiner

CONTROL DEVICE FOR VEHICLE AND CONTROL METHOD FOR VEHICLE

CROSS-REFERENCE TO RELATED APPLICATIONS

This application is a National Phase of International Patent Application No. PCT/JP2017/038811 filed on Oct. 26, 2017, which claims priority to Japanese Patent Application No. 2016-219872 filed on Nov. 10, 2016. The contents of these applications are herein incorporated by reference in their entirety.

TECHNICAL FIELD

The present invention relates to a control device for a vehicle and a control method for a vehicle.

BACKGROUND ART

An automatic transmission of a park-by-wire type is known which includes no mechanical linkage between a shifter such as a shift lever or a shift switch and a park lock mechanism for unrotatably locking an output shaft of the automatic transmission and operates the park lock mechanism and the like by an actuator by outputting an electrical signal corresponding to a movement of the shifter to the actuator (see JP2008-128444A).

In the automatic transmission of the park-by-wire type, when a driver operates the shifter to a parking range, a signal is output from a control device to the actuator to operate the park lock mechanism and unrotably lock the output shaft (park lock ON). Further, when the driver operates the shifter from the parking range to a range other than the parking range, the locking of the output shaft by the park lock mechanism is released (park lock OFF).

SUMMARY OF INVENTION

A time required to unlock the park lock mechanism varies according to a meshing load of the park lock mechanism. Since the meshing load of the park lock mechanism becomes large, for example, during parking on a hill or during the towing of a boat or the like by the vehicle, the unlocking of the park lock mechanism may be delayed.

In such a state, when the driver operates the shifter from the parking range to a travel range, it is difficult to match a timing at which an engaging element of the automatic transmission is engaged and a timing at which a park lock is turned off. If the engaging element is engaged earlier, the problem is that a load applied to the park lock mechanism becomes even larger.

The present invention has an object to enable a load applied to a park lock mechanism to be suppressed even if an engaging element is engaged before the park lock is turned off.

According to one aspect of the present invention, a control device for a vehicle including a drive source and an automatic transmission having a park lock mechanism for unrotatably locking an output shaft and an engaging element to be engaged at start running, output rotation of the drive source being input to the automatic transmission, the control device includes a control unit configured to limit a torque of the drive source until the release of locking by the park lock mechanism is completed if an instruction is given to change from a parking range to a travel range.

According to another aspect of the present invention, a control device for a vehicle including a drive source and an automatic transmission having a park lock mechanism for unrotatably locking an output shaft and an engaging element to be engaged at start running, output rotation of the drive source being input to the automatic transmission, the control device includes a control unit configured to limit a torque of the drive source until the release of locking by the park lock mechanism and the engagement of the engaging element are completed if an instruction is given to change from a parking range to a travel range.

According to another aspect of the present invention, a control method for a vehicle including a drive source and an automatic transmission having a park lock mechanism for unrotatably locking an output shaft and an engaging element to be engaged at start running, output rotation of the drive source being input to the automatic transmission, the control method includes limiting a torque of the drive source until the release of locking by the park lock mechanism is completed if an instruction is given to change from a parking range to a travel range.

According to another aspect of the present invention, a control method for a vehicle including a drive source and an automatic transmission having a park lock mechanism for unrotatably locking an output shaft and an engaging element to be engaged at start running, output rotation of the drive source being input to the automatic transmission, the control method includes limiting a torque of the drive source until the release of locking by the park lock mechanism and the engagement of the engaging element are completed if an instruction is given to change from a parking range to a travel range.

According to these aspects, the torque of the drive source is limited until the release of locking by the park lock mechanism and the engagement of the engaging element are completed. Thus, even if the engaging element is engaged before the park lock is turned off, a load applied to the park lock mechanism can be suppressed. Further, even if the unlocking of the park lock mechanism is delayed, a sudden start running of the vehicle can be prevented.

DESCRIPTION OF EMBODIMENT

Hereinafter, an embodiment of the present invention is described with reference to the drawings.

Figure 1:
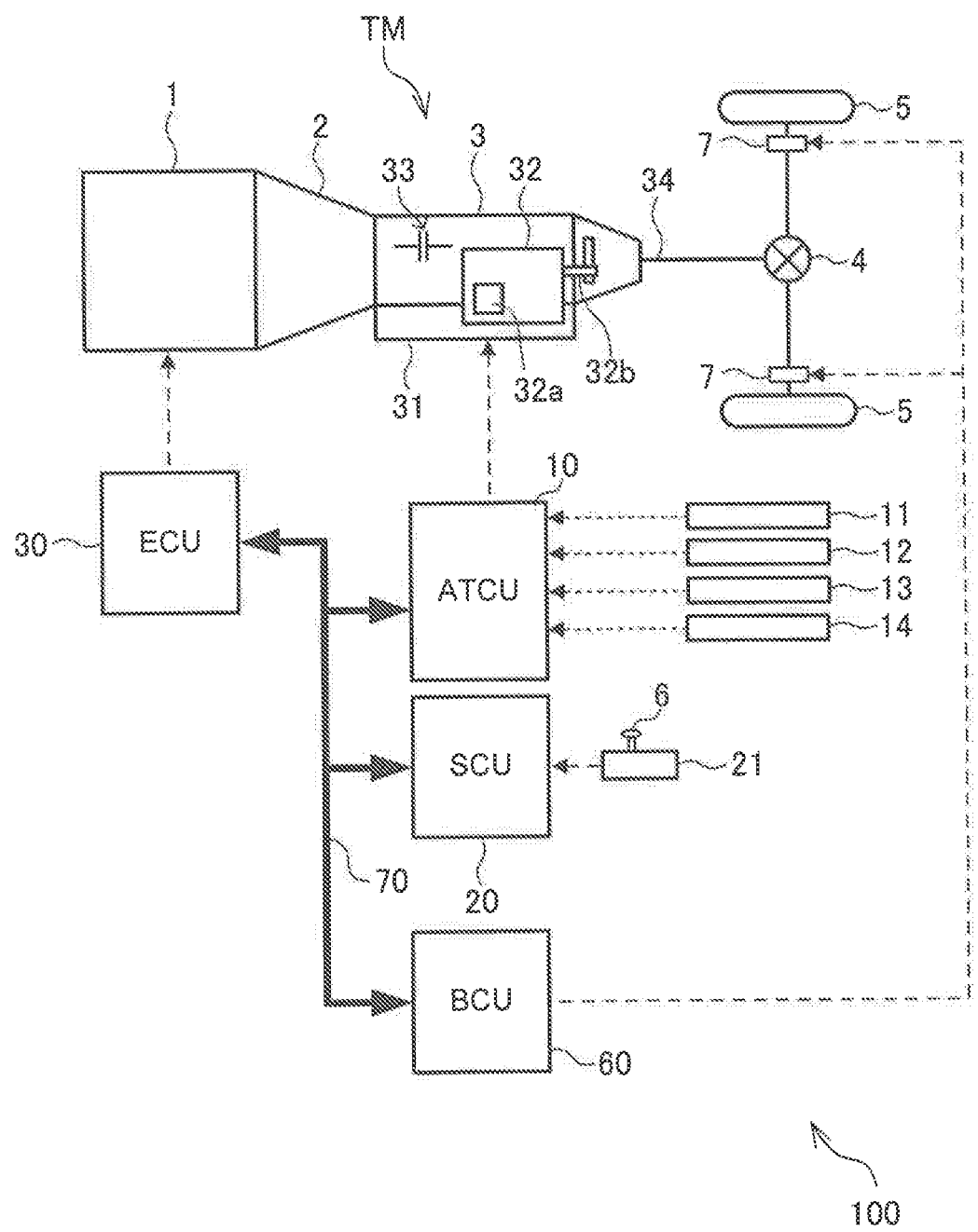
FIG. 1 is schematic configuration diagram of a vehicle according to an embodiment of the present invention.

FIG. 1 is a schematic configuration diagram of a vehicle 100. The vehicle 100 includes an engine 1 serving as a drive source. Output rotation of the engine 1 is transmitted to drive wheels 5 via an automatic transmission TM and a differential device 4.

The automatic transmission TM is constituted by a torque converter 2 and a transmission mechanism 3. The automatic transmission TM has a drive (D) range, a reverse (R) range, a neutral (N) range, a parking (P) range and the like as ranges and can set any one of these as a set range. The D-range and the R-range are travel ranges and the N-range and the P-range are non-travel ranges.

The set range of the automatic transmission TM is set by a driver operating a shifter 6. The shifter 6 is, for example, a momentary type shift lever which automatically returns to a neutral position after an operation, but may be a button-type shift switch, a general shifter for changing a set range according to the position of a shift lever, or the like. Which range was selected by the shifter 6 is detected by a shifter position sensor 21.

The transmission mechanism 3 is a stepped automatic transmission and includes a planetary gear mechanism and a plurality of engaging elements 33 (clutches and a brake). The transmission mechanism 3 can switch a gear position (gear ratio) and forward/reverse travel by changing engaged states of the plurality of engaging elements 33.

The transmission mechanism 3 further includes a control valve unit 31 and a park lock mechanism 32.

The control valve unit 31 includes a plurality of solenoids for controlling working hydraulic pressures of the engaging elements 33 of the transmission mechanism 3.

The park lock mechanism 32 unrotatably locks an output shaft 34 of the automatic transmission TM during parking. If the set range of the automatic transmission TM is set to the P-range, a park rod 32b is driven to a locking position by an actuator 32a. In this way, an engaging claw (not shown) engages a park gear (not shown) provided on the output shaft 34 of the automatic transmission TM to mechanically lock the output shaft 34 (park lock ON). In contrast, if the set range of the automatic transmission TM is set to the range other than the P-range, the park rod 32b is driven to an unlocking position by the actuator 32a. In this way, the engaging claw and the park gear are disengaged to unlock the output shaft 34 (park lock OFF).

Hydraulic braking devices 7 are provided for the drive wheels 5 and unillustrated driven wheels. Braking forces acting on the vehicle 100 from the braking devices 7 are adjusted according to a depressed amount of a brake pedal by the driver and, in addition, the braking forces can be caused to act on the vehicle 100 at an arbitrary timing in response to a signal from a BCU 60 to be described later.

The ATCU 10 is an automatic transmission control unit serving as a control unit and controls the automatic transmission TM. Signals from an accelerator pedal opening sensor 11 for detecting an accelerator pedal opening APO, which is an operated amount of an accelerator pedal, a vehicle speed sensor 12 for detecting a vehicle speed VSP, a parking position sensor 13 for detecting the position of the park rod 32b of the park lock mechanism 32, a brake switch 14 for detecting whether or not the brake pedal is depressed, and the like are input to the ATCU 10.

The ATCU 10 is mutually communicably connected to an SCU 20, an ECU 30 and the BCU 60 via a CAN 70.

The SCU 20 is a shift control unit. The SCU 20 generates a required range signal corresponding to the range selected by the shifter 6 on the basis of a signal from the shifter position sensor 21, and outputs the generated signal to the ATCU 10.

The ATCU 10 sets the range of the automatic transmission TM on the basis of the required range signal from the SCU 20. The ATCU 10 outputs a control command value to the control valve unit 31 according to the set range of the automatic transmission TM as described next.

If the range of the automatic transmission TM is set to the D-range, the ATCU 10 determines a target gear position by reference to a shift map on the basis of the vehicle speed VSP and the accelerator pedal opening APO and outputs a control command value for achieving the target gear position to the control valve unit 31. In this way, the plurality of solenoids is controlled according to the control command value and the working hydraulic pressures of the plurality of engaging elements 33 are adjusted to achieve the target gear position.

If the range of the automatic transmission TM is set to the R-range, the ATCU 10 determines a reverse gear position as the target gear position and outputs a control command value for achieving the target gear position to the control valve unit 31. In this case, the plurality of solenoids is controlled to achieve the reverse gear position.

If the range of the automatic transmission TM is set to the P-range or N-range, the ATCU 10 outputs a control command value for disengaging the plurality of engaging elements 33 to the control valve unit 31.

Here, the ATCU 10 controls the park lock mechanism 32 if the set range is changed between the P-range and the range other than the P-range. In this way, a park lock is activated or a park locked state is released.

The ECU 30 is an engine control unit and controls the engine 1. The ECU 30 outputs a rotation speed NE of the engine 1, a throttle opening TVO and the like to the ATCU 10.

The BCU 60 is a brake control module and controls braking forces by the braking devices 7.

In the present embodiment, a control device of the vehicle 100 is constituted by the ATCU 10, the SCU 20, the ECU 30 and the BCU 60. It should be noted that the control device of the vehicle 100 may further include other control units. Further, the functional sharing of each control unit may be appropriately changed or an integrated control unit having several functions integrated may be provided.

Each control unit can be constituted by a microcomputer with a central processing unit (CPU), a read only memory (ROM), a random access memory (RAM) and an input/output interface (I/O interface). It is also possible to constitute each control unit by a plurality of microcomputers.

A time required to unlock the park lock mechanism 32 varies according to a meshing load between the engaging claw of the park lock mechanism 32 and the park gear. Since the meshing load between the engaging claw and the park gear becomes large, for example, during parking on a hill or during the towing of a boat or the like by the vehicle 100, the unlocking of the park lock mechanism 32 may be delayed.

In such a state, when the driver operates the shifter 6 from the P-range to the D-range, it is difficult to match a timing at which the engaging element 33 is engaged and a timing which the park lock is turned off. If the engaging element 33 is engaged earlier, the problem is that a load applied to the park lock mechanism 32 becomes even larger.

Figure 2:
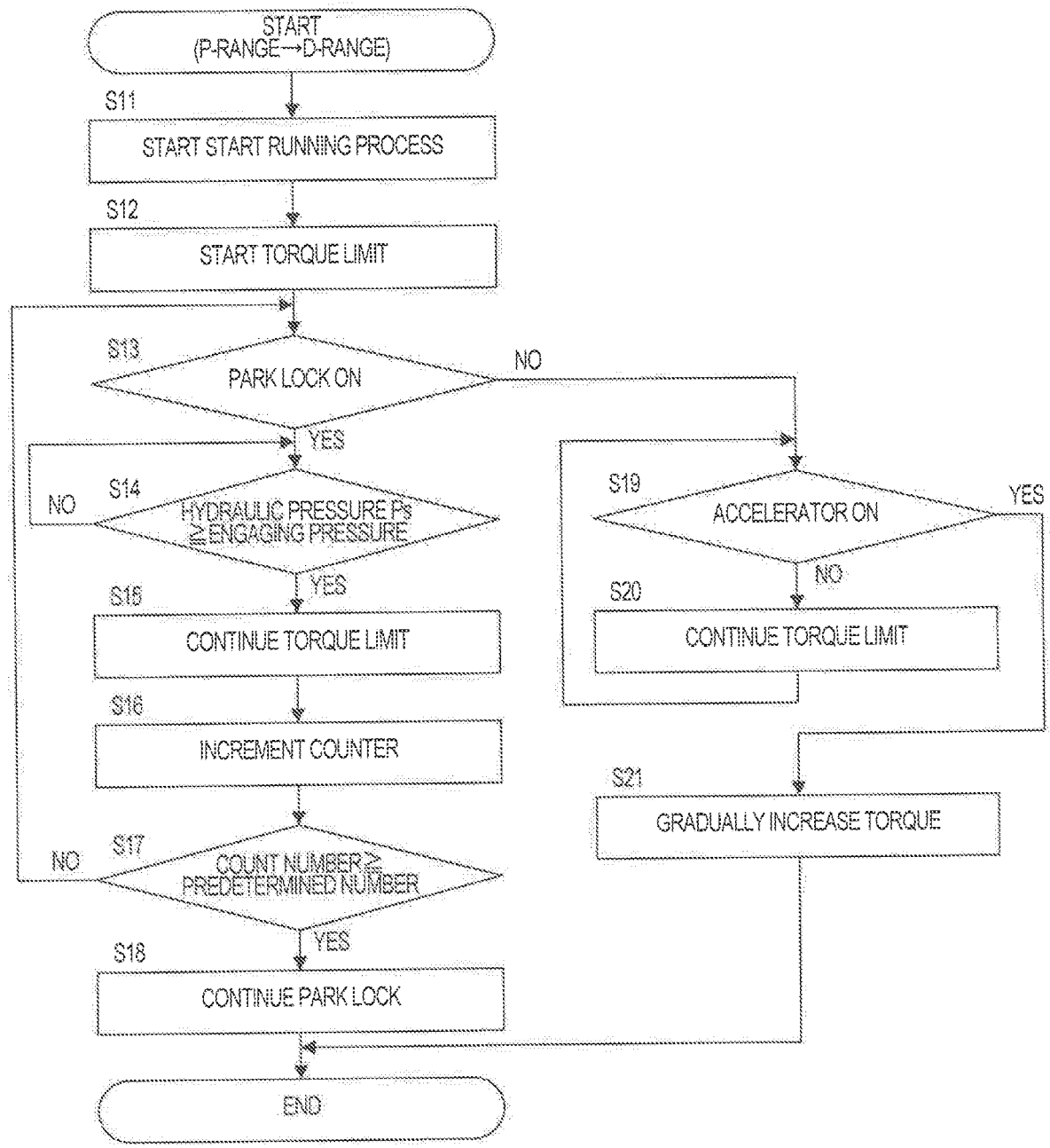
FIG. 2 is a flow chart showing contents of a control executed by an ATCU.

Thus, the ATCU 10 of the present embodiment executes a torque limit control shown in a flow chart of FIG. 2 when the shifter 6 is operated from the P-range to the D-range, whereby a load applied to the park lock mechanism 32 can be suppressed even if the engaging element 33 is engaged before the park lock is turned off.

Contents of the torque limit control executed by the ATCU 10 are described in detail with reference to FIG. 2.

The ATCU 10 starts a start running process (Step S11) when the selected range is changed from the P-range to the D-range.

In the start running process, the ATCU 10 outputs a signal for unlocking the park lock mechanism 32 to the actuator 32a. Further, the ATCU 10 outputs a control command value for engaging the engaging element 33 to be engaged at start running of the vehicle 100, out of the plurality of engaging elements 33, to the control valve unit 31.

In Step S12, the ATCU 10 starts a torque limit of the engine 1. Specifically, the ATCU 10 outputs a signal for limiting a torque of the engine 1 to the ECU 30.

In this way, the torque of the engine 1 is so limited, for example, that a movement amount when the vehicle 100 starts is about a travel amount by a so-called creep phenomenon.

In Step S13, the ATCU 10 determines whether or not the park lock is on.

The determination of Step S13 is made on the basis of a signal from the parking position sensor 13 for detecting the position of the park rod 32b.

The ATCU 10 advances the process to Step S14 if it is determined that the park lock is on. Further, the ATCU 10 advances the process to Step S19 if it is determined that the park lock is off.

In Step S14, the ATCU 10 determines whether or not a hydraulic pressure Ps supplied to the engaging element 33 to be engaged at start running of the vehicle 100 has become equal to or higher than an engaging pressure, i.e. the engagement of the engaging element 33 to be engaged at start running of the vehicle 100 has been completed.

The determination of Step S14 is made on the basis of a signal from a hydraulic pressure sensor (not shown) for detecting the hydraulic pressure Ps.

The ATCU 10 advances the process to Step S15 if it is determined that the hydraulic pressure Ps has become equal to or higher than the engaging pressure. Further, the ATCU 10 repeats the processing of Step S14 unless it is determined that the hydraulic pressure Ps has become equal to or higher than the engaging pressure.

In Step S15, the ATCU 10 continues the torque limit of the engine 1.

In Step S16, the ATCU 10 increments a built-in counter.

In Step S17, the ATCU 10 determines whether or not a count number of the counter has become equal to or larger than a predetermined value.

The ATCU 10 advances the process to Step S18 if it is determined that the count number has become equal to or larger than the predetermined value. Further, the ATCU 10 returns the process to Step S13 unless it is determined that the count number has become equal to or larger than the predetermined value.

That the count number has become equal to or larger than the predetermined value means that a park lock ON state has continued for a predetermined time regardless of an output of the signal for unlocking the park lock mechanism 32 to the actuator 32a. In this case, there is a possibility that locking by the park lock mechanism 32 cannot be released not due to a delay in unlocking, but due to some trouble or the like.

Thus, the ATCU 10 outputs a signal for locking the park lock mechanism 32 to the actuator 32a to continue the park lock ON state if the count number has become equal to or larger than the predetermined value (if the state where the locking by the park lock mechanism 32 is not released continues for the predetermined time).

In Step S19, the ATCU 10 determines whether or not an accelerator is on.

The ATCU 10 advances the process to Step S21 if it is determined that the accelerator is on. Further, the ATCU 10 advances the process to the Step S20 if it is determined that the accelerator is not on (accelerator is off).

If the accelerator is off, it is thought that the driver has no intention to accelerate the vehicle 100. Thus, in this case, the ATCU 10 continues the torque limit of the engine 1 (Step S20) and returns the process to Step S19.

In Step S21, the ATCU 10 gradually increases the torque of the engine 1. Specifically, the ATCU 10 outputs a signal for gradually increasing the torque of the engine 1 to the ECU 30. In this way, the torque of the engine 1 gradually increases.

That is, the ATCU 10 gradually increases the torque of the engine 1 with a gradient smaller than a predetermined gradient regardless of the accelerator pedal opening APO. On the other hand, the torque of the engine 1 increases with a gradient larger than the predetermined gradient if the torque is not limited and the accelerator pedal opening APO is equal to or larger than a predetermined value.

As described above, in the present embodiment, the torque of the engine 1 is limited until the release of locking by the park lock mechanism 32 and the engagement of the engaging element 33 are completed if the shifter 6 is operated from the P-range to the D-range.

Thus, even if the engaging element 33 to be engaged at start running of the vehicle 100 is engaged before the park lock is turned off, a load applied to the park lock mechanism 32 can be suppressed.

Further, unless the locking by the park lock mechanism 32 is released, the vehicle 100 does not start even if the driver depresses the accelerator. Thus, the driver is thought to further depress the accelerator before the locking is released if the unlocking of the park lock mechanism 32 is delayed.

In such a case, if the torque of the engine 1 is increased according to the accelerator pedal opening APO immediately after the release of locking by the park lock mechanism 32 and the engagement of the engaging element 33 are completed, there is a possibility that the vehicle 100 suddenly starts.

In contrast, in the present embodiment, the torque of the engine 1 is gradually increased even if the accelerator is on after the release of locking by the park lock mechanism 32 and the engagement of the engaging element 33 are completed.

Thus, even the unlocking of the park lock mechanism 32 is delayed and the park lock is turned off with the driver largely depressing the accelerator, a sudden start running of the vehicle 100 can be prevented.

Figure 3:
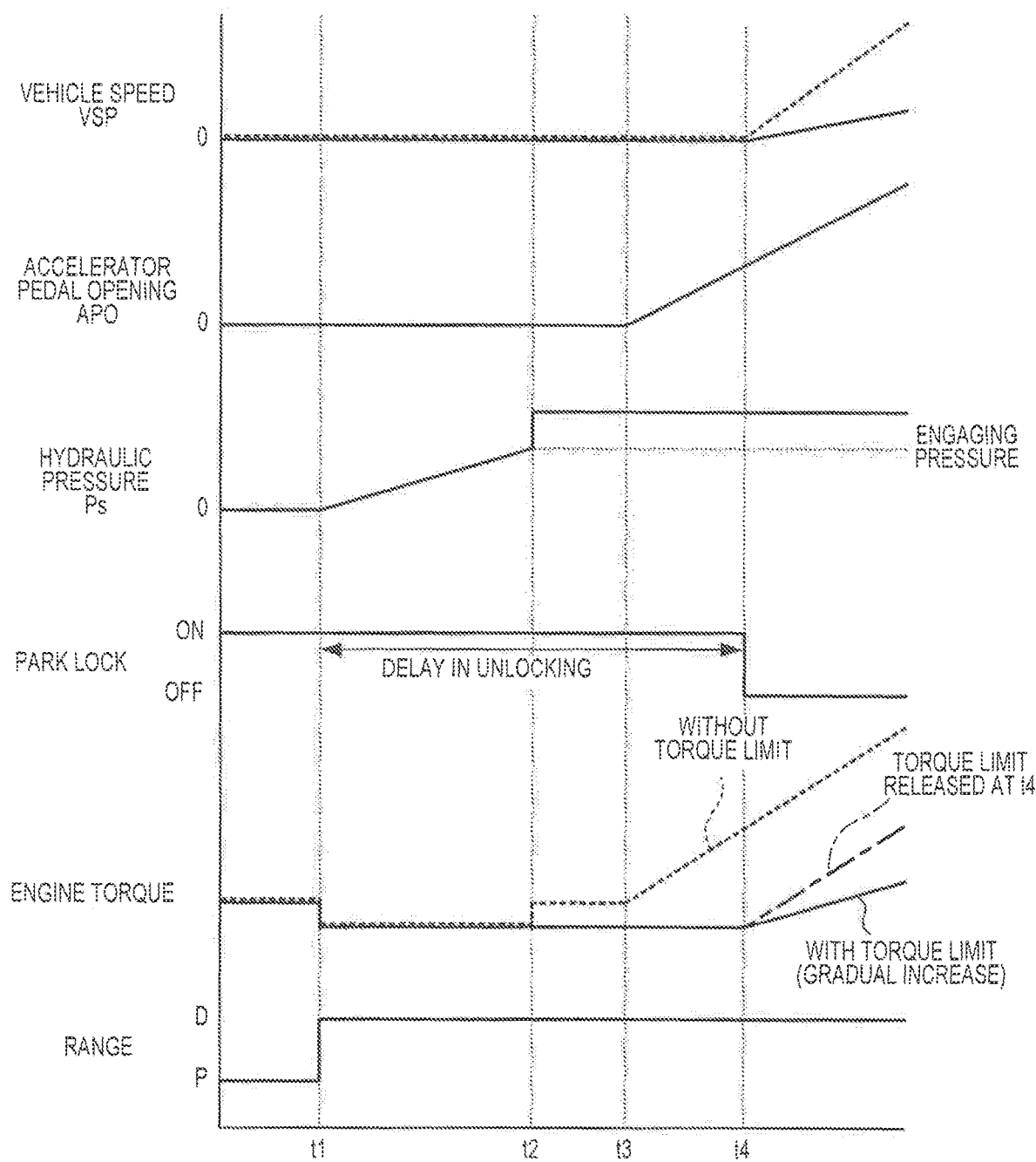
FIG. 3 is a time chart showing a state of start running of the vehicle.

Next, a state of start running of the vehicle 100 is described with reference to a time chart of FIG. 3. In FIG. 3, the unlocking of the park lock mechanism 32 is delayed until time t4. It should be noted that the vehicle speed VSP (dotted line) shows a change of the vehicle speed VSP when the torque limit control is not executed as a comparative example, and the same also applies to an engine torque (dotted line).

When the set range is changed from the P-range to the D-range at time t1, the torque of the engine 1 decreases due to the torque limit. Further, the hydraulic pressure Ps to be supplied to the engaging element 33 to be engaged at start running increases. The ATCU 10 outputs a signal for unlocking the park lock mechanism 32 to the actuator 32a at this point of time.

At time t2, the hydraulic pressure Ps becomes the engaging pressure and the engagement of the engaging element 33 is completed.

At time t3, the driver depresses the accelerator to increase the accelerator pedal opening APO. However, at this point of time, the park lock is on and the vehicle 100 does not start (vehicle speed VSP=0). In FIG. 3, the accelerator pedal opening APO further increases also thereafter by the driver further depressing the accelerator.

At time t4, the park lock is turned off and the vehicle 100 starts.

In the present embodiment, as described above, after the release of locking by the park lock mechanism 32 and the engagement of the engaging element 33 are completed, the torque of the engine 1 is gradually increased even if the accelerator is on.

Thus, after time t4, the engine torque gradually increases and the vehicle speed VSP accordingly gradually increases. That is, the vehicle 100 does not suddenly start.

On the other hand, if the torque limit control of the present embodiment is not executed, the torque limit of the engine 1 is released even in the park lock ON state if the hydraulic pressure Ps becomes the engaging pressure at time t2.

In this case, a load applied to the park lock mechanism 32 increases from time t2 to time t4, particularly for a period between time t3 and time t4 during which the torque of the engine 1 increases according to the accelerator pedal opening APO.

Further, since the torque of the engine 1 increases according to the accelerator pedal opening APO after time t3, the vehicle 100 suddenly starts if the park lock is turned off at time t4.

It should be noted that an engine torque represented by a dashed-dotted line after time t4 shows a change of the engine torque when a process of gradually increasing the torque is not performed after time t4, the torque limit is completely released at time t4.

As just described, even if the torque limit of the engine 1 is released at time t4, the torque is limited when the park lock is turned off at time t4. Thus, a sudden start of the vehicle 100 can be prevented.

As described above, the ATCU 10 of the present embodiment limits the torque of the engine 1 until the release of locking by the park lock mechanism 32 and the engagement of the engaging element 33 to be engaged at start running are completed if an instruction is given to change from the P-range to the D-range.

Since the torque of the engine 1 is limited according to this, even if the engaging element 33 is engaged earlier in the park lock ON state, a load applied to the park lock mechanism 32 can be suppressed. Further, even if the unlocking of the park lock mechanism 32 is delayed, a sudden start of the vehicle 100 can be prevented.

Further, the ATCU 10 gradually increases the torque of the engine 1 if the accelerator is on after the release of locking by the park lock mechanism 32 and the engagement of the engaging element 33 are completed.

According to this, a sudden start of the vehicle 100 can be prevented even if the unlocking of the park lock mechanism 32 is delayed.

Although the embodiment of the present invention has been described above, the above embodiment is merely an illustration of one application example of the present invention and not intended to limit the technical scope of the present invention to the specific configuration of the above embodiment.

For example, in the above embodiment, the present invention is applied to the case where the driver operates the shifter 6 from the P-range to the D-range. However, the present invention may be applied to the case where the driver operates the shifter 6 from the P-range to the R-range.

Further, whether or not the state where the locking by the park lock mechanism 32 is not released has continued for the predetermined time is determined on the basis of the determination number of times (count number) of the park lock ON (see FIG. 2). However, the method for determining whether or not the above state has continued for the predetermined time is not limited to this method.

Further, the transmission mechanism 3 constituting the automatic transmission TM needs not be a stepped transmission mechanism and may be a continuously variable transmission mechanism.

With respect to the above description, the contents of application No. 2016-219872, with a filing date of Nov. 10, 2016 in Japan, are incorporated herein by reference.

The invention claimed is:

1. A control device for a vehicle including a drive source and an automatic transmission having a park lock mechanism for unrotatably locking an output shaft and an engaging element to be engaged at a start of running, output rotation of the drive source being input to the automatic transmission, the control device comprising:
a control unit configured to limit a torque of the drive source until the release of locking by the park lock mechanism is completed in response to an instruction being given to change from a parking range to a travel range,
wherein the control unit is configured to limit the torque of the drive source from after the instruction is given to change from the parking range to the travel range until the release of locking by the park lock mechanism is completed.

2. A control device for a vehicle including a drive source and an automatic transmission having a park lock mechanism for unrotatably locking an output shaft and an engaging element to be engaged at a start of running, output rotation of the drive source being input to the automatic transmission, the control device comprising:
a control unit configured to limit a torque of the drive source until the release of locking by the park lock mechanism and the engagement of the engaging element are completed in response to an instruction being given to change from a parking range to a travel range.

3. The control device for a vehicle according to claim 2, wherein:
the control unit is configured to gradually increase the torque of the drive source in response to an accelerator being on after the release of locking by the park lock mechanism and the engagement of the engaging element are completed.

4. The control device for a vehicle according to claim 2, wherein:
the control unit is configured to limit the torque of the drive source from after the instruction is given to change from the parking range to the travel range until the release of locking by the park lock mechanism and the engagement of the engaging element are completed.

5. A control method for a vehicle including a drive source and an automatic transmission having a park lock mechanism for unrotatably locking an output shaft and an engaging element to be engaged at a start of running, output rotation of the drive source being input to the automatic transmission, the control method comprising:
limiting a torque of the drive source until the release of locking by the park lock mechanism is completed in response to an instruction being given to change from a parking range to a travel range,
the limitation being executed from after the instruction is given to change from the parking range to the travel range until the release of locking by the park lock mechanism is completed.

6. A control method for a vehicle including a drive source and an automatic transmission having a park lock mechanism for unrotatably locking an output shaft and an engaging element to be engaged at a start of running, output rotation of the drive source being input to the automatic transmission, the control method comprising:

limiting a torque of the drive source until the release of locking by the park lock mechanism and the engagement of the engaging element are completed in response to an instruction being given to change from a parking range to a travel range.

\* \* \* \* \*